9/20/83 OR 4,405,853

United States Patent [19]

Klein

[11] 4,405,853

[45] Sep. 20, 1983

[54] PLASMA SPRAY GUN WITH COOLING FIN NOZZLE AND DEIONIZER

[75] Inventor: John F. Klein, Port Washington, N.Y.

[73] Assignee: Metco Inc., Westbury, N.Y.

[21] Appl. No.: 292,764

[22] Filed: Aug. 14, 1981

[51] Int. Cl.[3] .................................... B23K 9/00

[52] U.S. Cl. .................... 219/121 PP; 219/121 PN; 219/121 PM; 219/121 PL; 239/132.3

[58] Field of Search ...... 219/121 P, 121 PM, 121 PP, 219/121 PN, 76.16, 74, 75, 120, 137.62; 239/132.1, 132.3, 131; 313/231.3-231.5

[56] References Cited

U.S. PATENT DOCUMENTS

| | | | |
|---|---|---|---|
| 3,641,308 | 2/1972 | Couch, Jr. et al. | 219/121 PN |
| 3,684,911 | 8/1972 | Perugini et al. | 219/121 PP |
| 3,914,573 | 10/1975 | Muehlberger | 219/121 PL |
| 4,293,755 | 10/1981 | Hill et al. | 219/10.43 |

FOREIGN PATENT DOCUMENTS

| | | | |
|---|---|---|---|
| 2834732 | 4/1979 | Fed. Rep. of Germany | 219/121 PN |

OTHER PUBLICATIONS

Welding Handbook, Section 2, Sixth Edition, pp. 29.34, 29.35, ©1969.

*Primary Examiner*—M. H. Paschall
*Attorney, Agent, or Firm*—S. A. Giarratana; F. L. Masselle; J. D. Crane

[57] ABSTRACT

A plasma spray gun nozzle with fins for cooling. The fins are designed in the region radially outward of the point where the arc strikes the nozzle to have a base width and a slot width and slot depth having advantageous dimensions. Coolant is forced through the slots at a rate to achieve optimum heat transfer. Accordingly, the design for the nozzle used in its desired manner provide a plasma flame spray gun which will operate for an appreciably longer time than could prior art plasma flame spray guns before a gun failure is likely to occur.

20 Claims, 5 Drawing Figures

PLASMA SPRAY GUN WITH COOLING FIN NOZZLE AND DEIONIZER

BACKGROUND OF THE INVENTION

The present invention relates to the field of plasma flame spray guns and particularly to a plasma flame spray gun nozzle with a thin nozzle wall and an annular coolant passage having cooling fins therein, which increases the nozzle life over that previously achieved with prior art designs.

In typical plasma flame spraying systems, an electrical arc is created between a water cooled nozzle (anode) and a centrally located cathode. An inert gas passes through the electrical arc and is excited thereby to temperatures of up to 30,000° F. The plasma of at least partially ionized gas issuing from the nozzle resembles an open oxy-acetylene flame. A typical plasma flame spray gun is described in U.S. Pat. No. 3,145,287.

The electrical arc of such plasma flame spray guns, being as intense as it is, causes nozzle deterioration and ultimate failure. One cause for such deterioration is the fact that the arc itself strikes the nozzle/anode at a point thereby causing instantaneous melting and vaporizing of the nozzle surface. Deterioration is also caused by overheating the nozzle to the melting point so that part of the nozzle material flows to another location which may eventually cause the nozzle to become plugged.

There are varying degrees and rates associated with each cause for nozzle deterioration. Experience has shown that wall erosion, ultimately causing the coolant to burst through the nozzle wall, is another cause of nozzle failure. When the jacket bursts, coolant water is released into the arc region, resulting in a locally intense electrical arc, causing parts to melt. Once a meltdown has occurred, gun repair can be very costly. The nozzle deterioration and failure problem is particularly severe at high power levels.

In seeking to overcome this problem, plasma flame spray guns have been designed with easily changed water cooled nozzles. During operation, water coolant is forced under pressure through passages in the nozzle to cool the nozzle walls. Even so, gradual, or sometimes rapid, deterioration occurs, and as a precaution against failure, the nozzles are usually replaced after a given number of hours of service. This practice of replacing the nozzle periodically, however, is quite costly, because the interchangable nozzles are fairly expensive and many nozzles with considerable remaining life are thereby discarded.

Many factors are involved in determining the rate of deterioration and ultimate failure of a plasma flame spray gun nozzle. For the most part, nozzle operating conditions and geometry, gas type and flow rate influence the nozzle life, as well as does nozzle cooling.

The prior art generally recognizes that cooling the nozzle wall is necessary and has the above-noted effect on nozzle life. The prior art, however, does not recognize the optimum design for nozzles and cooling passages, including cooling fins in plasma spray guns, thus leaving the designer to endless experimentation in attempting to determine the optimum design for maximum nozzle life.

Some installations of plasma spraying equipment have included deionizers in the coolant system which, as indicated by recent studies, has enhanced the life of the nozzle. The reason for the nozzle life enhancement apparently arises from a reduction of scale formation within the coolant passages of the nozzle. However, under more severe operating conditions, e.g. high power level, use of a deionizer alone is not sufficient to significantly enhance nozzle life.

Therefore, it is the primary objective of the present invention to provide a plasma flame spray system designed to maximize nozzle life.

It is a further objective of the present invention to provide a nozzle for a plasma flame spray gun, which includes cooling fins and is designed to maximize the operational life thereof.

It is still a further objective of the present invention to provide a nozzle for a plasma flame spray gun with a coolant passage therein designed to maximize heat removal from the nozzle wall.

It is yet a further objective of the present invention to provide a nozzle for a plasma flame spray gun having a wall thickness which maximizes the nozzle life as defined by the equation:

$$Life=(T_{start}-T_{min})/R$$

where $T_{start}$ is the initial wall thickness, $T_{min}$ is the wall thickness at failure and R is the erosion rate in depth per unit time.

Another objective of the present invention is to provide a nozzle for a plasma flame spray gun having a wall thickness, a coolant passage therein, and cooling fins in the coolant passage all designed to minimize melting and flow of nozzle material to thereby reduce failure by plugging of the nozzle.

BRIEF DESCRIPTION OF THE INVENTION

In achieving the foregoing and other objectives of the present invention, the plasma spray gun system of the present invention has a nozzle designed for long life. The nozzle has a plurality of fins disposed within the coolant passage and extending radially outward from the nozzle wall, the inner side of which is subjected to the plasma flame. When the coolant flows between and around the fins, heat is removed from the fin sides as well as from the nozzle wall located at the base of the slot between adjacent fins. The range of dimensions for base width of the fins, the width of the slot between the fins, the depth of the slot and the nozzle wall thickness are selected to maximize nozzle life.

In addition, the plasma spray gun system of the present invention may include means to remove ions and dissolved gases from the coolant. Tests have demonstrated that removal of certain ions and trapped gases from the coolant has the advantageous effect of increasing nozzle life. In combination with the optimally designed nozzle with a thin nozzle wall and with cooling fins in the coolant passage, the nozzle life is extended beyond what could be expected, considering the nozzle life improvement achieved with the optimal nozzle design by itself and the nozzle life improvement achieved using a deionizer and/or a dissolved gas remover alone.

BRIEF DESCRIPTION OF THE DRAWINGS

The drawings illustrate various parts of the spray gun system according to the present invention wherein.

DETAILED DESCRIPTION OF THE INVENTION

Figure 1:
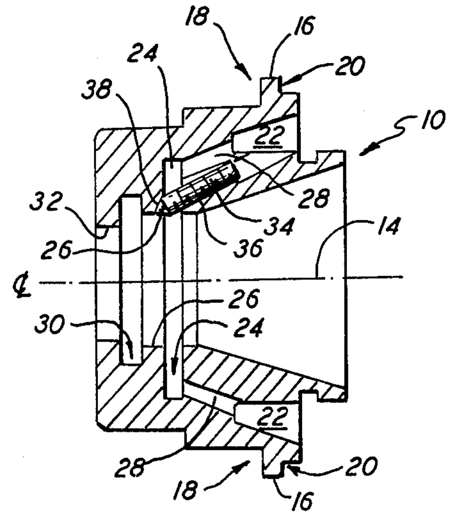
FIG. 1 is a sectional view of a nozzle shell which forms part of the nozzle for the present invention.

Referring to FIG. 1, a nozzle shell is illustrated generally at 10. This shell 10 is generally annular in shape and includes a central opening 12 which extends through the nozzle shell 10 and is symmetrically located with respect to the center line 14. The nozzle shell has a radially extending flange portion 16 with a forward facing surface 18 and a rear facing surface 20. When the nozzle, according to the present invention, is installed in a plasma flame spray gun such as a Type 3MB or Type 7MB manufactured by METCO Inc., Westbury, N.Y., the forward facing surface 18 bears against the rear surface of a holding ring (not shown) which attaches by threads, or the like, to the gun. The rear surface 20 of the flange 16 engages an O-ring (not shown) which bears against the forward surface of the gun, so that when the holding ring is tightened, the O-ring, which is in contact with the surface 20, is compressed to provide a seal between the nozzle shell and the gun body.

Figure 2:
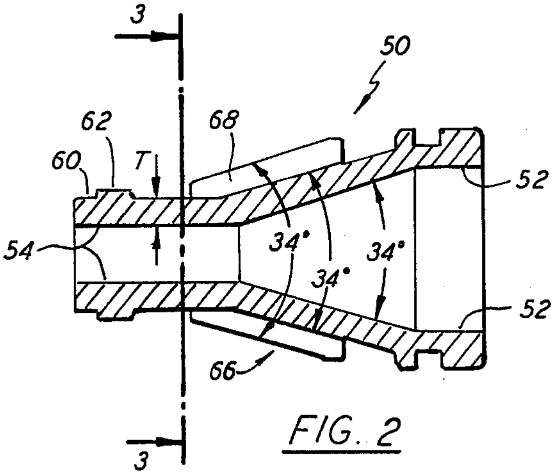
FIG. 2 is a sectional view of a fin cooled nozzle designed to interfit with the nozzle shell shown in FIG. 1.

The nozzle shell 10 includes an annular-shaped opening 22, which provides a passage for a liquid coolant, such as water, to be distributed evenly around the nozzle shell 10 when it is operatively coupled to the body of a plasma spray gun. The shell 10 additionally includes an annular slot 24 located in the inner wall 26. This slot 24 also provides a means for evenly distributing cooling fluid around the center line 14 of the nozzle shell 10 when it is operatively coupled to a nozzle as shown in FIG. 2.

Communicating between the slot 24 and the passage 22 is a plurality of bore holes 28 which are provided in the nozzle shell 10 in order to permit cooling fluid to pass between the slot 24 and the passage 22.

A second annular slot 30 is located between the portion having a cylindrical wall 26 and that portion having a cylindrical wall 32. The slot 30 is provided to receive an O-ring (not shown) to form a coolant seal. This coolant seal will be described in greater detail later.

Figure 4:
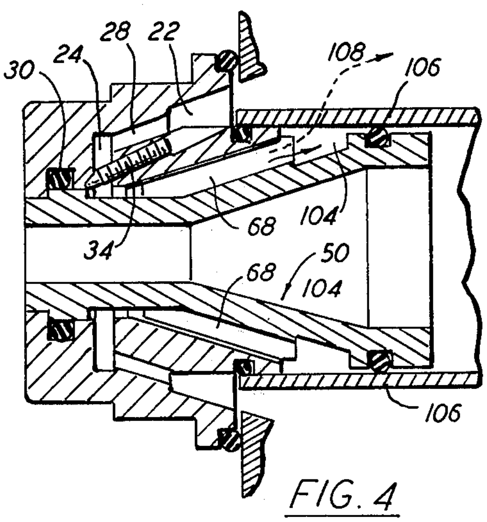
FIG. 4 is a sectional view of a nozzle shell and a nozzle positioned together to form a gun nozzle for the plasma spray gun system of the present invention.

The nozzle shell 10 additionally includes three set screws 34 (one being shown), each of which is located in a threaded bore such as 36, that are spaced evenly around the shell 10. The tip thereof 38 extends through the wall 26 for engaging, as illustrated in FIG. 4, the rear surface of the flange 60 to hold the nozzle 50 into the nozzle shell 10.

Referring now to FIG. 2, a nozzle is illustrated generally at 50. The nozzle 50 has an entrance portion with a substantially cylindrical wall 52 and an exit portion also having a substantially cylindrical wall 4. The diameter of the cylinder having wall 54 is smaller than the diameter of the cylinder having wall 52. Accordingly, the nozzle 50 includes a tapered portion having a tapering wall 56 which communicates between the wall 52 and the wall 54.

Disposed near the forward end of the nozzle 50 is a radially projecting flange 60 which completely encircles the nozzle at a point close to its forwardmost end. The outer surface 62 of the flange 60 is designed to cooperate with the slot 30 and the surface 26 so that a portion of the surface 62 bears against the surface 26 to in part provide a coolant seal. In addition, the surface 62 bears against an O-ring, which is located in the slot 30. This O-ring in the slot 30 (not shown in FIG. 1) additionally provides a seal between the coolant passage of the assembled nozzle and the exterior of the assembled nozzle.

As is readily understood, the nozzle wall temperature is a major contributing factor to nozzle life, and particularly the temperature at the point where the arc strikes the nozzle wall. Reducing the sidewall temperature of the nozzle has the effect of increasing the nozzle strength, reducing melting migration, reducing erosion rate and increasing the nozzle life. Such a nozzle wall temperature reduction can be achieved by reducing the wall thickness between the coolant passages in the nozzle and the arc/plasma passages. When the wall temperature goes down, the erosion rate also goes down; however, there is a trade off to be made between structural integrity and the reduced erosion rate. The reduced temperature due to the reduced wall thickness must lower the erosion rate fast enough to compensate for the reduced depth of tolerable erosion.

The body of the nozzle 50 comprises the anode of the plasma flame spray gun and is designed with a wall thickness of T in the region where the arc is likely to strike the anode. The body 50 is made of substantially pure copper (preferably at least 98% pure) and has a wall thickness T in the range of about 1.9 to 2.8 mm (0.075 to 0.110 inches).

Copper (substantially pure) is the preferred material for many parts of the nozzle because of its electrical and thermal properties. That is, copper is a good electrical and thermal conductor and yet has a relatively high melting point. Those of skill in the art will recognize that other metals or alloys with electrical and thermal properties substantially like those of copper can be used for the nozzle, although the dimensions may need to be somewhat different in order to optimize nozzle life.

In the region 66, the nozzle 50 has a plurality of fins 68 which are formed on the exterior surface of the nozzle 50. The fins 68 are shown in greater detail in FIG. 3 and extend radially outwardly from the surface 70 of the nozzle. Each such fin 68 has an outer surface 72 which, when the nozzle 50 is nested into the shell 10 as illustrated in FIG. 4, preferably does not bear against the tapered surface 74 of the nozzle shell 10, but has a gap therebetween of up to 2.5 mm (0.100 inches), with the preferred range being 0.127 to 2.0 mm (0.005 to 0.080 inches), while Applicant prefers using about 0.25 mm (0.010 inches).

Figure 3:
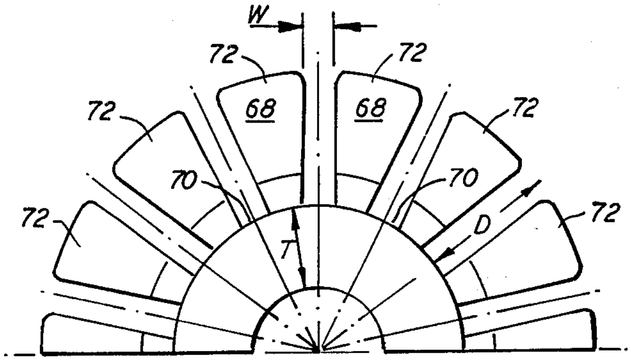
FIG. 3 is a partial sectional view taken along section line A—A of FIG. 2.

As illustrated in FIG. 3, each of the fins 68 is spaced equidistant from each other fin by a slot 76, which has a width W at the base of the slot and a depth indicated by the doubleheaded arrow D. Each of the fins have a base width B. The dimensions of the slot and the fin are important in assuming long life for the nozzle as these dimensions control the extent to which heat can be removed from the nozzle during operation of the plasma flame spray gun.

It has been found that the dimensions herein are important at a point radially outward of the point where the arc of the gun strikes the nozzle 50. This is determined by first making a nozzle 50 of the desired shape and running it under the desired operating conditions for a short time. The place of maximum erosion will identify the location where the arc strikes the nozzle. The fin and slot dimensions radially outward of the point where the arc strikes are then decided on.

The fin base B should be as thin as possible to provide maximum heat transfer away from teh axis of the nozzle, but the thinness is limited by the need for longitudinal heat flow and for structural strength. The slot width W similarly should be as small as possible but should not be so small as to restrict the turbulent water flwo or to allow blockage by bubbles or small particles of debris that inadvertently may be in the cooling system.

It has been determined that the fin base B should be in the range of between about 0.127 to 6.35 mm (0.005 to 0.250 inches), although it is preferred to be in the range of 0.25 to 1.27 mm (0.010 to 0.050 inches). The slot width W at the base of the slot should be in the range of between about 0.127 to 3.8 mm (0.005 to 0.150 inches), although it is preferred to be in the range of 0.025 mm to 1.78 mm (0.010 to 0.070 inches). The depth of the slot D should be in the range of between about 0.127 to 7.6 mm (0.005 to 0.300 inches), although the preferred range is from 0.25 to 2.5 mm (0.010 to 0.100 inches). The Applicant's preferred dimensions are 1 mm (0.040 inches) for B and W and D=2.3 mm (0.090 inches), although fins and slots falling in the preferred range will give similar performance.

Computer simulation suggests that another slightly different set of dimensions may also give excellent nozzle life. They are B=0.03 inches, W=0.02 inches and D=0.08 inches.

The exact fluid used for cooling the nozzle according to the present invention is not critical, although it is desirable to have a fluid which can rapidly absorb the heat flowing through the nozzle 50 from the intense heat zone in the region of the arc to the cooler zone in the region of the thin annular passage. The rate of fluid flow is preferably sufficient to prevent the fluid in the thin annular passage between the nozzle 50 and the shell from boiling due to contact with the exterior surface of the nozzle 50. The principle reason for this is that preventing boiling of the fluid also reduces scale formation on the exterior surface of the nozzle 50, which therefore promotes longer useful life of the nozzle. A high coolant flow rate also reduces the extent of gases which become dissolving in the coolant which has the beneficial effect of improving nozzle life.

The rate of flow through the passages should have a Reynolds Number in the range of 2000 to 100,000, while the preferred range is between 5000 and 50,000. Testing has shown that a Reynolds Number of 10,000 works very well. These figures are achieved with a flow rate for water through the slots in the range of 0.76 to 46 meters per second (2.5 to 150 feet per second), with the preferred range being between 3 to 18 meters per second (10 to 60 feet per second). Actual coolant speed of about 6 meters per second (20 feet per second) has given good results. This coolant speed translates to about 0.25 liters per second (4 gallons per minute) of water through a nozzle having dimensions in the preferred range.

Referring now to FIG. 4, the shell 10 of FIG. 1 and the nozzle 50 of FIG. 2 are shown interfitted with each other, as well as inserted into the gun body of a plasma spray gun such as the Type 3M or 7M manufactured by Metco, Inc. of Westbury, N.Y. The body of the gun 100 has an internal passage indicated generally by the arrow 102 which couples with the opening 22 and permits a cooling fluid, such as water, to be pumped into the passage 22 from an external source. The coolant then can flow through the bore 28 and the passage 24 to the forward end of the slots formed between adjacent fins 68 on the nozzle 50. The cooling fluid then passes through the slots between the fins 68 and exits into the passage 104 formed between the wall of the nozzle 50 and a cylindrical wall 106, which forms part of the gun. The coolant then passes through the wall 106 through a passage (not shown) indicated by the arrow 108 and is thereafter either discarded or placed into a reservoir for recirculation back through the nozzle.

Those of skill in the art will readily recognize that the specific design may take other forms. For example, the screws 34 and O-ring 30 may be omitted and replaced with silver soldered joints between the shell 10 and the nozzle 50. Alternatively, the shell 10 may be made in two halves with holes therethrough so that they can be screwed or bolted together to from the coolant passages between the shell and nozzle. Such an arrangement is similar to that described in U.S. patent application Ser. No. 292,763, filed on Aug. 14, 1981, entitled "Heavy Duty Plasma Spray Gun". That application also describes a gun which can use a nozzle of the present invention.

Figure 5:
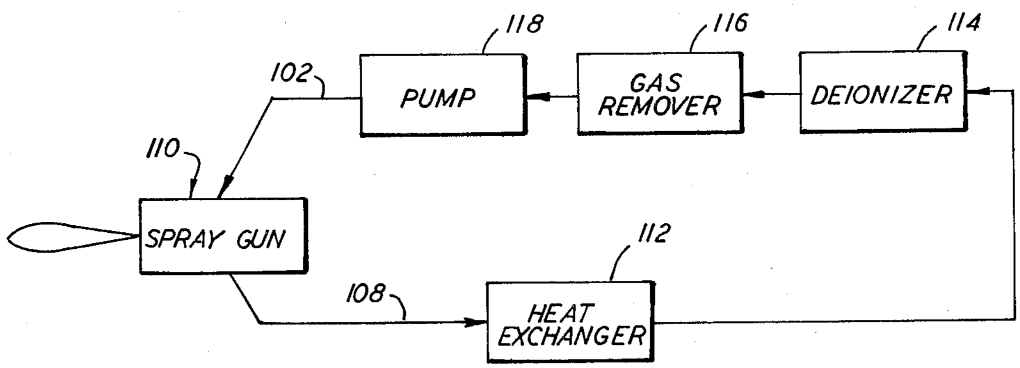
FIG. 5 illustrates a plasma spray gun utilizing the nozzle of FIGS. 1-4 and additionally includes a deionizer and a dissolved gas remover.

Referring now to FIG. 5, the cooling system for the nozzle according to the present invention may take the form shown therein or it may comprise a simple system wherein a source of water is coupled to the annular-shaped opening 22 and the fluid exiting from the passage 104 is simply allowed to be discharged. The system of FIG. 5, however, is a closed loop system which offers, among other advantages, a means for reducing cost of coolant water used by the system.

The water exiting from the plasma flame spray gun 110 is at a higher temperature than that entering the gun and exits the gun through the passage 104 via a conduit 108 and eventually reaches a heat exchanger 112 which may comprise a conventional heat exchanger arrangement. Once the temperature of the cooling fluid is reduced, the fluid then passes through a pump 118, which raises the fluid pressure on the output side of the pump to a sufficient level so as to provide the desired cooling fluid flow rate through the nozzle. The cooling fluid then passes through a deionizer 114 which removes ions from the cooling fluid by means of an ion transfer resin contained in the deionizer 114. A suitable resin for this purpose is known as Red Line mixed bed resin and is manufactured by Crystalab.

After exiting the deionizer 114, the cooling fluid then passes through a dissolved gas remover 116, which may be of the resin type, having a suitable resin for removing dissolved oxygen from the cooling fluid. An alternative approach for removing dissolved gases is to use a pressure reducer of the type used by electrical utilities companies. In the process of reducing the pressure of the cooling fluid, dissolved gases within the fluid are released. If a pressure reducer is used in the configuration of FIG. 5, the position of the pump 118 and the gas remover 116 must be reversed. Dissolved gas in the cooling fluid has the effect of diminishing nozzle life and, by removing such gas from the cooling fluid, nozzle life improves.

The output of the gas remover 116 communicates via a pipe 102 to the spray gun 110. This allows the cooling fluid to recirculate through the nozzle and ultimately back to the heat exchanger 112. It should be noted that it is preferable to locate the deionizer 114 and the gas remover 116 as close as is practical to the fluid input of the plasma spray gun.

While the arrangement shown in FIG. 5 includes a heat exchanger 112, a deionizer 114 and a gas remover 116, each with a specific function, it is possible to operate the plasma flame spray gun of the present invention including a nozzle of the type illustrated in FIGS. 1-4 with a closed loop cooling system including only a heat exchanger 112 and a pump 118. These two elements are necessary to assure sufficient coolant flow through the nozzle to prevent melting.

As indicated above, however, the deionizer 114 does have an advantageous effect in that it has been shown that deionizing the cooling fluid has the effect of improving nozzle life. Test results of the present system indicate, however, that adding a deionizer 114 to the system including a thin wall nozzle with fins disposed in a thin annular passage as illustrated in FIGS. 1-4 results in a product life improvement which is greater than one would expect, considering the nozzle life improvement achieved by the thin annular passage nozzle of FIGS. 1-4 by itself and the nozzle life improvement achieved by a deionizer by itself. Accordingly, it is advantageous, though not necessary, for systems according to the present invention to include a deionizer of the type described.

The system of FIG. 5 also includes a gas remover 116 which, as already indicated, may comprise a pressure reducing device of the type used in the electrical utility industry, although other pressure reducers or other means, such as an oxygen removing resin may be used. As indicated above, the gas remover 116 is not an essential element of the present invention, but may be used in cooperation with other system elements to achieve an increase in nozzle life.

An alternative approach is to use a single cannister in the coolant path located close to the coolant entry to the nozzle. The cannister has a layer of deionizer resin, a layer of deoxygenator resin and a layer of charcoal. This single cannister arrangement sreves to remove ions, oxygen and other dissolved gases from the coolant before it enters the nozzle.

The foregoing and other modifications to the system illustrated in FIGS. 1-5 may be made without departing from the spirit and scope of the present invention as defined in the following claims.

What is claimed is:

1. A plasma flame spray gun nozzle comprising, in combination:

an inner member generally cylindrical in shape with a longitudinal axis and defining a passage in which an arc may be formed to create a plasma flame, the arc striking said inner member in an arc striking area on the inner surface of said inner member, said inner member being formed of a material having substantially the same electrical and thermal properties as substantially pure copper;

a plurality of fins on the outer surface of and comprising part of said inner member, each said fin being disposed to form a slot in a generally longitudinal direction between it and each adjacent fin, each said slot being formed with a slot width at its base in the range of between 0.127 mm and 3.8 mm and a slot depth in the range of between 0.127 mm and 7.6 mm, each said fin having, in the region radially outward of said arc striking area, a base width in the range of between 0.127 mm and 6.35 mm, said inner member having a wall thickness in the range of between 1.9 mm and 2.8 mm at the base of each said slot; and an outer member disposed around said inner member and having an inner surface located not greater than 2.5 mm away from the radially outwardmost surface of each said fin to form a passage between said outer member and said inner member for channeling a coolant.

2. The nozzle of claim 1 wherein said slot depth radially outward of said arc striking area is about 2.3 mm.

3. The nozzle of claim 1 wherein each said slot has a width at its base of about 0.04 mm.

4. The nozzle of claim 1, 2 or 3 wherein each said fin has a base width of about 0.04 mm.

5. The nozzle of claim 2 wherein each said slot has a width at its base of about 0.04 mm.

6. The nozzle of claim 5 wherein each said fin has a base width of about 0.04 mm.

7. The nozzle of claim 1 additionally including means to secure said inner member to said outer member.

8. The nozzle of claim 7 additionally including means communicating with said passage between said inner member and said outer member to force a coolant through said passage.

9. The nozzle of claim 1 wherein said inner member is made of substantially pure copper.

10. The nozzle of claim 1 additionally including means to force a liquid through the passageway between said outer member and said inner member.

11. The nozzle of claim 10 additionally including means to remove ions from the liqud being forced through said passageway.

12. The nozzle of claim 10 or 11 additionally including a heat exchanger to remove heat from the liquid after it leaves said nozzle.

13. The nozzle of claim 10 or 11 additionally including means to remove dissolved gas from the liquid being forced through said passageway.

14. The nozzle of claim 10 additionally including a heat exchanger to remove heat from said liquid after it leaves said nozzle and a means to remove dissolved gases from said liquid.

15. The nozzle of claim 10 additionally including a heat exchanger to remove heat from said liquid after it leaves said nozzle, an ion remover to remove ions from said liquid before it enters said nozzle and means to remove dissolved gases from said liquid before it enters said nozzle.

16. A plasma spray gun nozzle cooling arrangement comprising, in combination:

an inner nozzle member made of a material having substantially the same electrical and thermal characteristics as substantially pure copper, said inner member being generally cylindrical in shape and defining a central passage in which an arc is formed;

a plurality of fins formed on the exterior surface of said inner nozzle member in the region radially outward of the location where said arc is formed, each said fin being separated from adjacent fins by a slot of uniform width in the range of between 0.25 mm and 1.78 mm, each said fin having a base width in the range of between 0.25 mm and 1.27 mm, each said slot has a slot depth of between 0.25 mm to 2.5 mm, and said inner member has a wall thickness at the base of each said slot of between 1.9 mm to 2.8 mm;

an outer member disposed around said inner nozzle member and having an inner surface located not greater than 2.5 mm away from the radially outwardmost surface of each said fin, said outer member including at least one liquid coolant passage therethrough and communicating with the passageway formed between said outer member and said inner member;

coolant circulating means communicating with said liquid coolant passage and the pasageway formed between said outer member and said inner member to circulate a liquid through said nozzle to cool it;

a heat exchanger coupled to said coolant circulating means to remove heat from said coolant before it enters said nozzle; and means to remove ions from said liquid prior to its entering said nozzle.

17. The arrangement of claim 16 additionally including a dissolved gas removing means to remove dissolved gases from said cooling liquid.

18. The nozzle of claim 1 wherein there is a gap in the range of between 0.127 mm to 2.0 m between said fins and said outer member.

19. The nozzle of claim 18 wherein said gap is about 0.25 mm.

20. The arrangement of claim 17 additionally including a deoxygenator.

* * * * *